United States Patent
Veeraswamy et al.

(10) Patent No.: US 9,542,401 B1
(45) Date of Patent: Jan. 10, 2017

(54) USING EXTENTS OF INDIRECT BLOCKS FOR FILE MAPPING OF LARGE FILES

(75) Inventors: Sairam Veeraswamy, South Grafton, MA (US); Peter C. Bixby, Westborough, MA (US); Peter W. Madany, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1322 days.

(21) Appl. No.: 13/436,533

(22) Filed: Mar. 30, 2012

(51) Int. Cl.
*G06F 7/00* (2006.01)
*G06F 17/30* (2006.01)

(52) U.S. Cl.
CPC ............... *G06F 17/30088* (2013.01)

(58) Field of Classification Search
CPC ............ G06F 3/064; G06F 17/30091; G06F 17/30088; G06F 3/0608; G06F 17/30067; G06F 11/1435; G06F 17/30; G06F 3/0643
USPC .......................... 707/822, 828–831
See application file for complete search history.

(56) References Cited

U.S. PATENT DOCUMENTS

| | | | |
|---|---|---|---|
| 4,945,475 A | 7/1990 | Bruffey et al. | |
| 5,276,840 A | 1/1994 | Yu | |
| 5,371,885 A | 12/1994 | Letwin | |
| 5,375,233 A | 12/1994 | Kimber et al. | |
| 5,454,103 A | 9/1995 | Coverston et al. | |
| 5,537,592 A | 7/1996 | King et al. | |
| 5,875,444 A | 2/1999 | Hughes | |
| 5,974,503 A | 10/1999 | Venkatesh et al. | |
| 5,991,862 A | 11/1999 | Ruane | |
| 6,029,166 A | 2/2000 | Mutalik et al. | |
| 6,353,837 B1 | 3/2002 | Blumenau | |
| 6,895,418 B1 | 5/2005 | Crow et al. | |
| 7,107,385 B2 | 9/2006 | Rajan et al. | |
| 7,424,497 B1 * | 9/2008 | Leverett et al. | |
| 7,555,504 B2 | 6/2009 | Bixby et al. | |
| 7,676,514 B2 | 3/2010 | Faibish et al. | |
| 8,204,871 B1 * | 6/2012 | Pawar et al. | 707/705 |
| 2002/0112022 A1 * | 8/2002 | Kazar et al. | 709/217 |
| 2004/0030822 A1 | 2/2004 | Rajan et al. | |
| 2005/0066095 A1 * | 3/2005 | Mullick et al. | 710/200 |
| 2005/0246382 A1 | 11/2005 | Edwards | |

(Continued)

OTHER PUBLICATIONS

Vahalia, Uresh, Unix Internals: The New Frontiers, 1996, p. 187-290, 338-371, Prentice-Hall, Inc., Upper Saddle River, New Jersey.

(Continued)

*Primary Examiner* — Tony Mahmoudi
*Assistant Examiner* — Linh Black
(74) *Attorney, Agent, or Firm* — Polsinelli PC

(57) ABSTRACT

Large files in a file system are mapped by extents of contiguous indirect blocks in order to reduce the time for read or write access to the large files while allowing allocation of data blocks one at a time. The inode of a file includes an indication of whether file mapping metadata of the file includes either an extent of contiguous indirect blocks or a tree of blocks. In a preferred mapping scheme, an inode contains an array of block pointer entries, and each entry includes a flag indicating whether the block pointer is pointing to either an extent of indirect blocks or a tree of blocks. For sharing of data blocks between files, the block pointer fields of the indirect blocks each contain an ownership flag indicating whether the pointed-to block is shared or not.

20 Claims, 12 Drawing Sheets

(56) References Cited

U.S. PATENT DOCUMENTS

| | | |
|---|---|---|
| 2007/0016754 A1 | 1/2007 | Testardi |
| 2007/0260842 A1 | 11/2007 | Faibish et al. |
| 2008/0082589 A1 | 4/2008 | English et al. |
| 2010/0281230 A1* | 11/2010 | Rabii et al. ............. 711/165 |
| 2011/0153976 A1* | 6/2011 | Tamura et al. .......... 711/170 |
| 2012/0278382 A1* | 11/2012 | Faith et al. ............. 709/203 |

OTHER PUBLICATIONS

McVoy, L. W., and Kleiman, S. R., "Extent-like Performance from a UNIX File System," USENIX—Winter '91, Jan. 21-25, 1991, Dallas, TX, 12 pages, Sun Microsystems, Santa Clara, CA.

"Extent (file systems)," Wikipedia, May 29, 2007, 2 pages, Wikimedia Foundation Inc., St. Petersburg, FL.

Ext4 Howto, Jul. 25, 2011, 12 pages, ext4.wiki.kernel.org, Linux Kernel Organization, Inc., San Jose, CA.

Sikand, Shiv, and March, Roger, "Highly Scalable, High Performance Perforce Server Environments," Perforce User Conference, May 8-9, 2003, Las Vegas, NV, 12 pages, Perforce Software Inc., Alameda, CA.

Trautman, Philip, and Mostek, Jim, "Scalability and Performance in Modern File Systems," printed May 6, 2005, 18 pages, Silicon Graphics, Mountain View, CA.

Florido, Juan Santos, "Journal File Systems," Linux Gazette, Jul. 2000, Issue 55, 11 pages, Seattle, WA.

Soltis et al., The Design and Performance of a Shared Disk File Syustem for IRIX, Sixth NASA Goddard Space Flight Center Conference on Mass Storage and Technologies, Fifteenth IEEE Symposium on Mass Storage Systems, Mar. 23-26, 1998, San Diego, CA, 17 pages, IEEE Computer Society, IEEE, New York, NY.

Preslan et al., A 64 bit, Shared Disk File System for Linux, Sixth NASA Goddard Space Flight Center Conference on Mass Storage and Technologies, Fifteenth IEEE Symposium on Mass Storage Systems, Mar. 23-26, 1998, San Diego, CA, 20 pages, IEEE Computer Society, IEEE, New York, NY.

Biliris, Alwxandros, An Efficient Database Storage Structure for Large Dynamic Objects, Proceedings, IEEE Data Engineering Conference, Phoenix, Arizona, Feb. 1992, pp. 301-308, IEEE, New York, NY.

\* cited by examiner

USING EXTENTS OF INDIRECT BLOCKS FOR FILE MAPPING OF LARGE FILES

FIELD OF THE INVENTION

The present invention relates generally to a file server that stores files using indirect blocks containing file mapping metadata. The file mapping metadata for each file maps the logical extent of the file to blocks of the file data.

BACKGROUND OF THE INVENTION

For convenient reference to stored computer data, the computer data is typically contained in one or more files. Each file has a logical address space for addressing the computer data in the file. In a file server, an operating system program called a file system manager assigns each file a unique numeric identifier called a "file handle," and also maps the logical address space of the file to a storage address space of at least one data storage device such as a disk drive.

Typically a human user or an application program accesses the computer data in a file by requesting the file system manager to locate the file. After the file system manager returns an acknowledgement that the file has been located, the user or application program sends requests to the file system manager for reading data from or writing data to specified logical addresses of the file.

One of the major responsibilities of the file system manager is to manage and allocate storage space. Normally, a file will consist of a collection of extents of storage space. The extents themselves may consist of consistent sized pieces, known as file system blocks, or they may be of various size extents. Larger extents reduce the number of things that must be managed; however, larger extents may be counter-productive to file system features such as thin provisioning, block sharing, or block de-duplication. In addition, very large extents can make it costly to create small files or to use the storage space efficiently in the face of file creations and deletions. When large extents are normally used, the file system usually has mechanisms in place that allow files to be created from smaller entities, when large extents are not available (for example when the file system has aged and become fragmented).

In order to effectively support a variety of file sizes, possibly using various extent sizes, the file mapping is normally accomplished with some form of tree structure. Two commonly used tree structures are the Indirect Block Tree originally introduced in UNIX, while many newer file systems, such as Oracle's Solaris ZFS, use a form of B-tree to keep track of the extents.

SUMMARY OF THE INVENTION

It has been observed that when files grow to extremely large sizes, the number of levels in either the Indirect Block tree or a B-tree can also grow to be quite large. The actual pointers to the data blocks are usually stored at the lowest levels of the tree (i.e. in the leaf nodes of the tree). Therefore it may be necessary to access many tree levels in order to determine the address of the target data block. Large trees usually have each level stored in separate blocks of storage. Thus in the worst case access to a file system data block could be delayed while the file system manager reads storage blocks containing each of the required tree levels. Therefore a new file mapping structure is desired that eliminates the need to have multiple levels of block mapping, but still has the advantages of allowing fine grained allocation of data (e.g. a block at a time). The desired solution combines many of the advantages of the tree structured index, while significantly reducing the number of I/O operations needed to obtain the block mapping.

In accordance with one aspect, the invention provides a method of operating a file server. The file server has data storage storing a file system, a data processor coupled to the data storage for access to files in the file system, and a non-transitory computer readable storage medium coupled to the data processor and storing computer instructions. Each of the files has an inode containing file attributes including an indication of whether file mapping metadata of the file includes either an extent of contiguous indirect blocks or a tree of blocks, so that some of the files in the file system are mapped by one or more extents of contiguous indirect blocks, and some of the files in the file system are mapped by one or more trees of blocks. The computer instructions, when executed by the data processor, perform a write operation to write data to a specified offset in a logical extent of a specified file in the file system by the steps of: (a) reading the inode of the specified file to obtain an indication of whether the file is mapped at the specified offset by either an extent of contiguous indirect blocks or a tree of blocks, and (b) using the indication of whether the file is mapped at the specified offset by either an extent of contiguous indirect blocks or a tree of blocks to obtain, from the file mapping metadata, a pointer to a data block for containing data at the specified offset of the specified file, and (c) using the pointer to write data to the data block for containing data at the specified offset in the logical extent of the specified file.

In accordance with another aspect, the invention provides a method of operating a file server. The file server has data storage storing a file system, a data processor coupled to the data storage for access to files in the file system, and a non-transitory computer readable storage medium coupled to the data processor and storing computer instructions. Some of the files in the file system have file mapping metadata including an extent of contiguous indirect blocks, and some of the files in the file system having file mapping metadata including a tree of blocks. The computer instructions, when executed by the data processor, perform a write operation to write data to a specified offset in a logical extent of a production file in the file system while maintaining a snapshot copy of the production file by the steps of: (a) accessing an indirect block in an extent of indirect blocks to read an ownership flag for the specified offset, and (b) in response to the ownership flag indicating that a data block for the specified offset is shared between the production file and the snapshot copy of the production file, writing data to a new data block for the production file, and changing the ownership flag to indicate that the data block for the specified offset is not shared between the production file and the snapshot copy of the production file, and extending a tree of blocks for file mapping of the data block that is no longer shared between the production file and the snapshot copy.

In accordance with a final aspect, the invention provides a file server. The file server includes data storage containing a file system, a data processor coupled to the data storage for access to files in the file system, and a non-transitory computer readable storage medium coupled to the data processor and storing computer instructions. Each of the files has an inode containing file attributes including an indication of whether file mapping metadata of the file includes either an extent of contiguous indirect blocks or a tree of blocks, so that some of the files in the file system are mapped by one or more extents of contiguous indirect blocks, and some of the files in the file system are mapped by one or more trees of blocks. The computer instructions, when executed by the data processor, perform a read operation to read data from a specified offset in a logical extent of a specified file in the file system by the steps of: (a) reading the inode of the specified file to obtain an indication of whether the file is mapped at the specified offset by either an extent of contiguous indirect blocks or a tree of blocks, and (b) using the indication of whether the file is mapped at the specified offset by either an extent of contiguous indirect blocks or a tree of blocks to obtain, from the file mapping metadata, a pointer to a data block containing data at the specified offset of the specified file, and (c) using the pointer to read data to the data block for containing data at the specified offset in the logical extent of the specified file.

BRIEF DESCRIPTION OF THE DRAWINGS

Additional features and advantages of the invention will be described below with reference to the drawings, in which.

Figure 1:
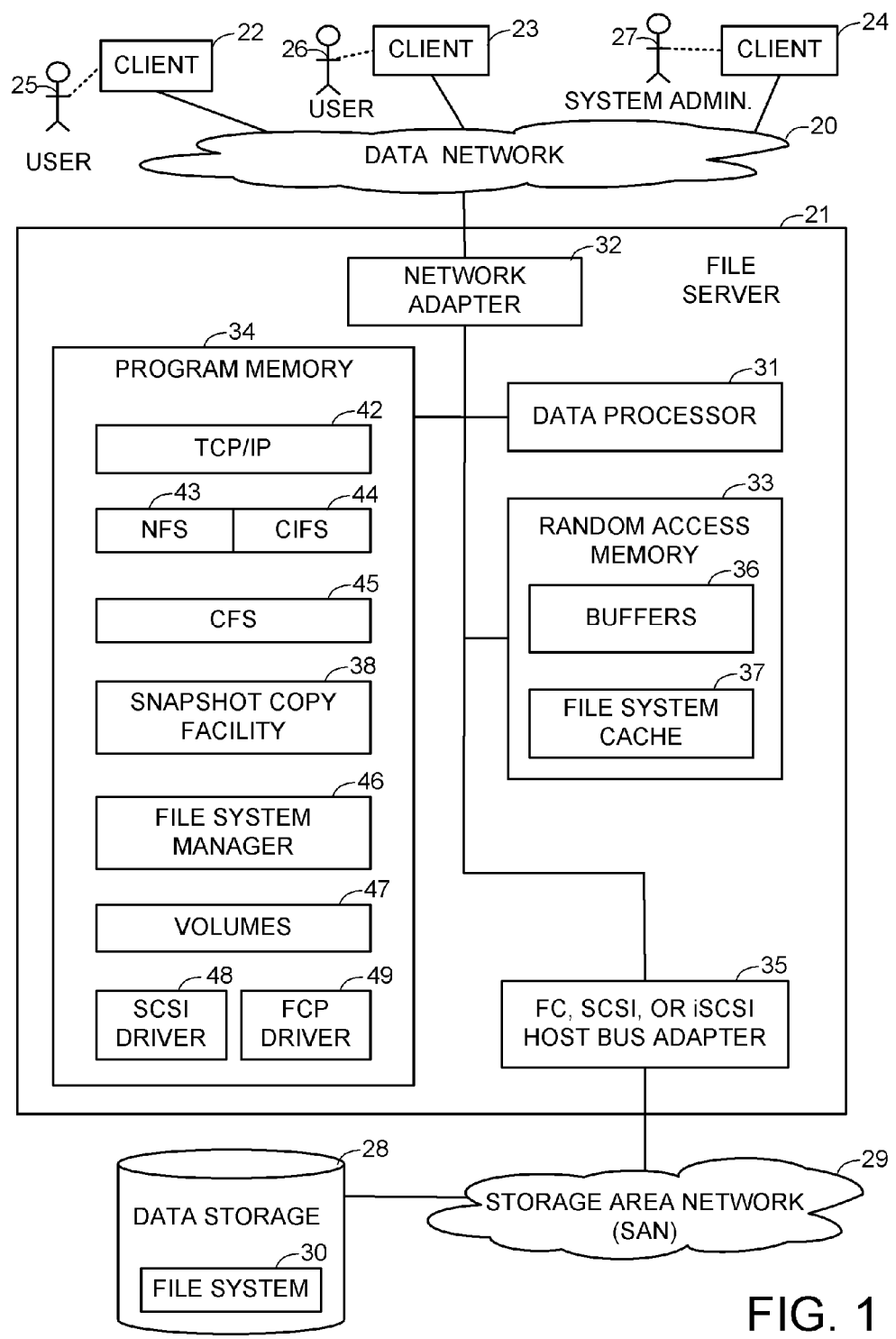
FIG. 1 is a block diagram of a data network including a file server incorporating the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a file server 21 for servicing file access requests from network clients 22, 23, 24. The network clients 22, 23, 24, for example, are workstations operated by respective human users 25, 26, 27. The file server permits the clients 22, 23, 24 to access files in a file system 30 stored in data storage 28 linked to the file server 21 via a storage area network (SAN) 29. The data storage 28, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 30 in the data storage 28, and maintains the file system cache 37 in the random access memory 33. The conventional organization and management of a UNIX-based file system is described in Uresh Vahalia, Unix Internals—The New Frontiers, Chapter 9, File System Implementations, pp. 261-290, Prentice-Hall, Inc., Upper Saddle River, N.J. (1996).

The program memory 34 further includes a logical volumes layer 47 providing a logical volume upon which the file system 30 is built. The logical volume is configured from the data storage 28. For example, the logical volume is configured from one or more logical unit numbers (LUNs) of the data storage 28. The logical volumes layer 47 is layered over a SCSI driver 48 and a Fibre-Channel protocol (FCP) driver 49 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The program memory 34 further includes a snapshot copy facility 38. The snapshot copy facility 38 creates a point-in-time copy of a production file while permitting read-write access to the production file. In this fashion, it is possible to make a snapshot copy of the production file and write a backup copy of the snapshot to the data storage 28 or to a client 22, 23, 24 concurrent with the read-write access to the production file. The snapshot copy facility 38 may use a method of sharing file system blocks among different versions of a file as described in Bixby et al. U.S. Pat. No. 7,555,504 issued Jun. 30, 2009, incorporated herein by reference.

The present invention concerns using extents of indirect blocks for file mapping of large files. By using a single contiguous map (or a small number of very large map extents) to hold the data block addresses for a large file, it is possible for the file system manager 46 to obtain a data block address in at most one I/O operation upon the data storage 28. Further, because portions of the map may be cached in the file system cache 37, it is possible that the data block address may be obtained from the file system cache 37 without reading the map from the data storage 28. Therefore, in the worst case, the file mapping overhead will be only a single I/O operation upon the data storage 28.

A reduction in the map I/O is significant because the access time for a read or write to a data block is the sum of the access times for all of the I/Os required to access the data block. For example, in order to read a data block where two (2) levels of map need to be read to get the data block address, the total time to accomplish the read can be no better than the total time to read each of the map blocks and then the data block. This is because the read operations must be serialized, meaning that each read operation must be completed before the following read operation can start.

By using extents of indirect blocks for file mapping of a large file, it is possible for each data block in the file to be individually addressed by a respective block pointer in one of the indirect blocks. This use of block-level mapping, as opposed to simply mapping larger and larger extents of data blocks, allows for the control and manipulation of individual data blocks within the file. For example, in a system where snapshots are accomplished by writing new contents to a new data block (i.e. never overwriting the original content) the data block address for the new write may be appropriately adjusted. Similarly, in a file system that supports data de-duplication, common data blocks may be shared by simply adjusting the block pointers within the map.

Moreover, it is possible for some files in the file system to use extents of indirect blocks for file mapping, and other files in the file system to use a conventional tree structured index for file mapping. It is also possible for a file in the file system to use a sparse tree structured index for sharing blocks with a file that uses an extent of indirect blocks for file mapping.

Figure 2:
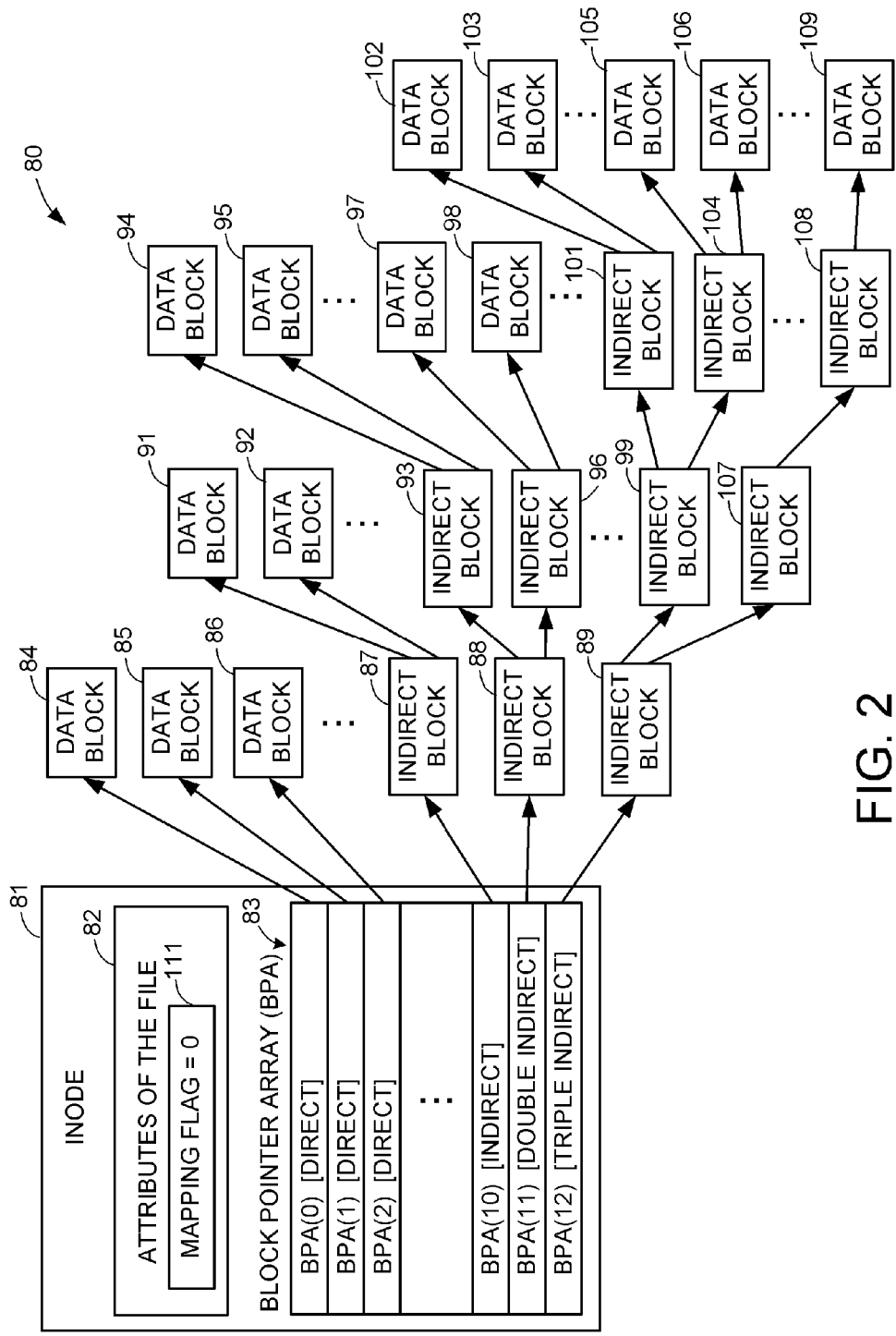
FIG. 2 is a block diagram of a file using a conventional tree structured index for file mapping.

For example, FIG. 2 shows a file 80 using a tree structured index for file mapping. The tree structured index is a tree of indirect blocks in accordance with the conventional mapping method of a UNIX-based file system. The file 80 includes an inode 81 containing attributes 82 of the file, and a block pointer array 83. The attributes 83 of the file include a mapping flag 111 set to zero to indicate that the file mapping is in accordance with the conventional mapping method of a UNIX-based file system.

In accordance with the conventional mapping method of a UNIX-based file system, the block pointer array 83 has thirteen entries having respective values BPA(0) to BPA (12). The first of up to ten entries BPA(0) to BPA(9) directly point to the first of up to ten data blocks 84, 85, 86, etc. of the file 80. (See Vahalia, FIG. 10-4, page 265.)

If the file 80 contains more than ten data blocks, then the eleventh entry of the block pointer array 83 contains an indirect block pointer BPA(10) pointing to an indirect block 87 containing pointers to one or more additional data blocks 91, 92, etc. If the file 80 contains so many data blocks that the indirect block 87 becomes full of block pointers, then the twelfth entry of the block pointer array 83 contains a double indirect block pointer BPA(11) to an indirect block 88 that itself points to an indirect block 93 that points to one or more additional data blocks 94, 95, etc. If the file 80 is so large that the indirect block 93 becomes full of block pointers, then the indirect block 88 will point to at least one more indirect block 96 that points to one or more additional data blocks 97, 98, etc.

If the file 80 is so large that the indirect block 88 becomes full of block pointers and its descendant indirect blocks are also full of block pointers, then the thirteenth entry of the block pointer array 83 contains a triple indirect block pointer BPA(12) to an indirect block 89 that points to an indirect block 99 that points to an indirect block 101 that points to one or more additional data blocks 102, 103, etc. If the file is so large that the indirect block 101 becomes full of pointers, then the indirect block 99 points to another indirect block 104 that points to one or more data blocks 105, 106, etc. If the file is so large that the indirect block 99 and its descendant indirect blocks are also full of pointers, then the indirect block 89 points to another indirect block 107 that points to yet another indirect block 108 that points to at least one data block 109, and so on. Once the indirect block 89 and its descendant indirect blocks become full of pointers, the file contains a maximum permitted number of data blocks.

For a very large file having a triple indirect block 89, the conventional mapping method shown in FIG. 2 may require four serial I/O operations to access a data block. For example, the first I/O operation is a read of the triple indirect block 89, the second is a read of the indirect block 107, the third is a read of the indirect block 108, and the fourth is a read or write to the data block 109.

In general, increases in the sizes of storage systems have allowed for the creation of extremely large data files. Random (or at least non-sequential) I/Os to these larger files causes a performance decrease when there are multiple levels of mapping between the inode 81 of the file and the data blocks of the file. Because file sizes are expected to grow, the conventional mapping method shown in FIG. 2 will likely result in an ever increasing performance impact. Therefore, the use of extents of indirect blocks for file mapping, as further described below, will improve performance immediately for very large files, and also prevent further degradation in the future as the average file size grows.

The use of extents of indirect blocks for file mapping also has the advantage that caching of the indirect blocks is more efficient. The fact that the extents of indirect blocks consist of only leaf-level indirect blocks means that a similar amount cache space will contain more actual mappings to data blocks than the caching of indirect blocks from files that use a tree of indirect blocks for file mapping. For the same reason, it is more economical to store the extents of indirect blocks on faster storage devices, such as solid state disks using flash memory.

Figure 3:
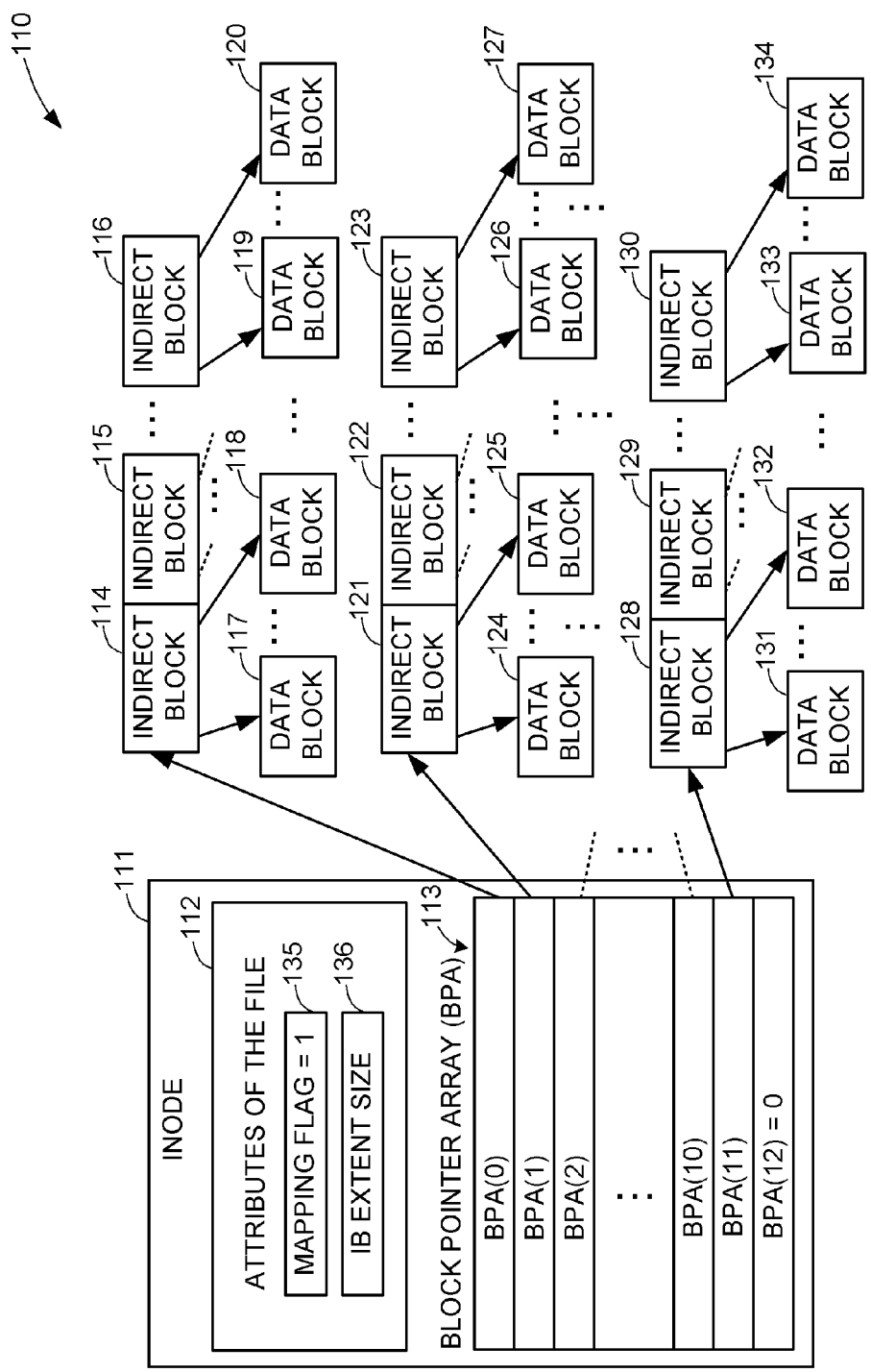
FIG. 3 is a block diagram of a file using extents of indirect blocks for file mapping.

FIG. 3 shows a file 110 using extents of contiguous indirect blocks for file mapping. The file 110 includes an inode 111 having file attributes 112 and a block pointer array 113. The file attributes 112 include a mapping flag 135 set to one to indicate that the file is using extents of indirect blocks for file mapping. The file attributes 112 also include an indirect block (IB) extent size 136 indicating the number of indirect blocks in each extent of indirect blocks that provide the file mapping metadata for the file 110. Each block pointer in the block pointer array 113 points to a respective extent of the indirect blocks, or if a block pointer has a value of zero (such as BPA(12)), then there is a hole (i.e., data having a value of zero) at the corresponding range in the logical extent of the file, or else the block pointer is not needed for mapping the file because the size of the file is less than the maximum size that can be mapped using extents of indirect blocks of the IB extent size 136.

For example, the first block pointer (BPA(0)) in the block pointer array 113 points to the first indirect block 114 of an indirect block extent also including the indirect block 115 and a last indirect block 116. The first indirect block 114 includes a first block pointer to a first data block 117 and a last block pointer to a data block 118. In a similar fashion, the last indirect block 116 includes a first block pointer to a data block 119 and a last block pointer to a last data block 120. Any block pointer in any of the indirect blocks may have a value of zero, indicating that there is a hole (i.e., data having a value of zero) at the corresponding block of the logical extent of the file. Therefore sparse allocation of the data blocks is supported by the extents of indirect blocks for file mapping. The data blocks can be allocated when the file is created or extended, or the data blocks can be allocated on demand when data is written to the data blocks.

The second block pointer (BPA(1)) in the block pointer array 113 points to a first indirect block 121 of an extent of indirect blocks including a second indirect block 122 and a last indirect block 123. The first indirect block 121 has a first block pointer pointing to a first data block 124, and a last block pointer pointing to a data block 125. The last indirect block 123 has a first block pointer pointing to a data block 126, and a last block pointer pointing to a last data block 127.

The twelfth block pointer (BPA(11)) in the block pointer array 113 points to a first indirect block 128 of an extent of indirect blocks including a second indirect block 129 and a last indirect block 130. The first indirect block 128 has a first block pointer pointing to a first data block 131, and a last block pointer pointing to a data block 132. The last indirect block 130 has a first block pointer pointing to a data block 133, and a last block pointer pointing to a last data block 134.

When a request is made to access a data block at a specified offset within the logical extent of the file, either for reading or writing, the file system manager determines the logical block address of the data block at the specified offset. The file system manager does this by determining an index into the block pointer array 113 based on the specified offset and the IB extent size 136, and then reading the indexed block array pointer from the block pointer array 113, and then using the indexed block array pointer to read the data block pointer from one of the indirect blocks in the extent of indirect blocks indicated by the indexed block pointer from the block pointer array. If the indirect block of interest is not already cached, then it will be read from the data storage. Therefore the data block address is obtained after no more than one I/O operation upon the data storage.

Figure 4:
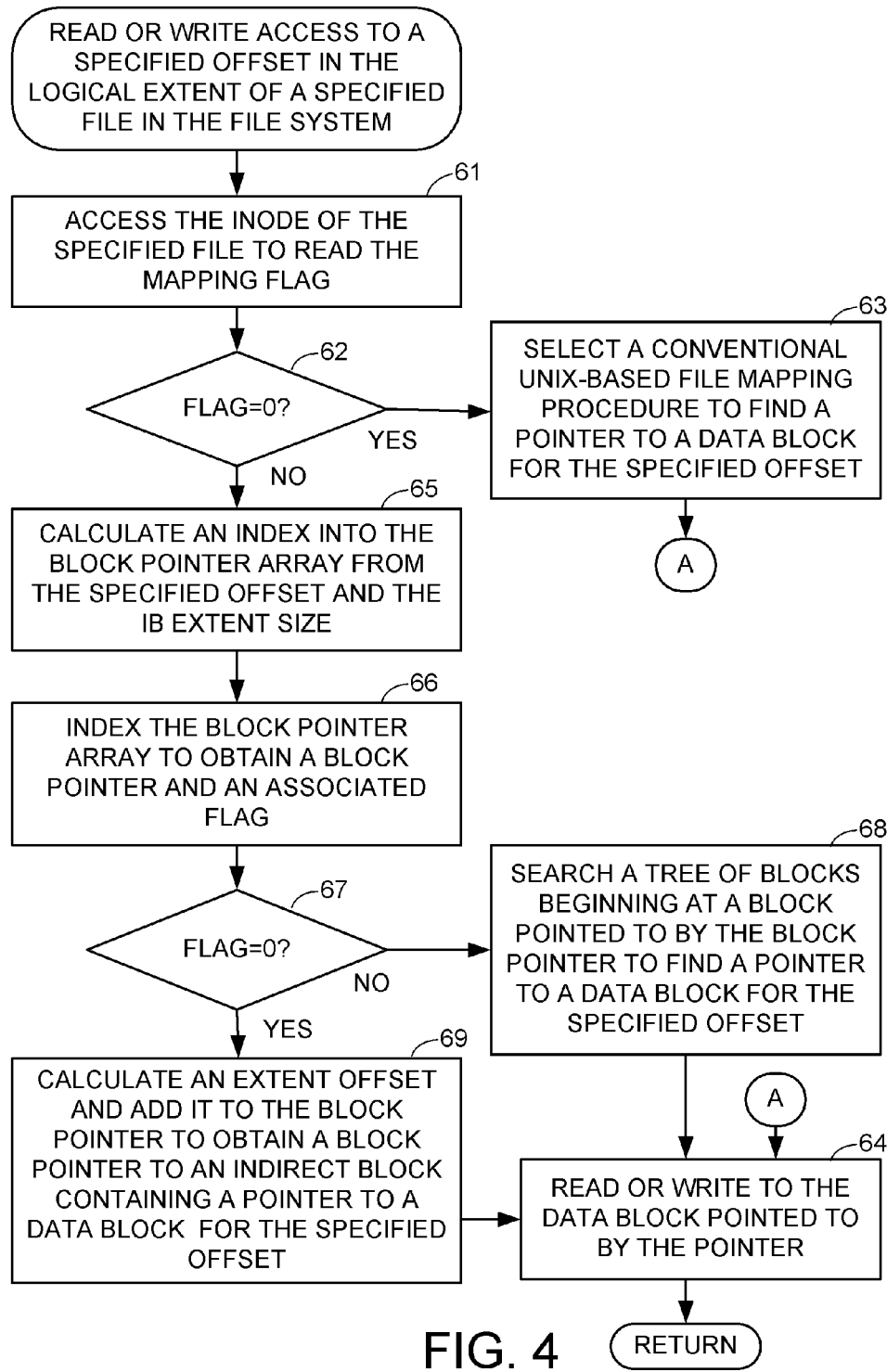
FIG. 4 is a flowchart of a procedure for read or write access to a file in the file system introduced in FIG. 1.

FIG. 4 shows a procedure for read or write access to a specified file in the file system, for a more general case in which the file may have the format of FIG. 2, or the file may have the format of FIG. 3, or the file may be a snapshot copy as further described below with reference to FIG. 8. In a first step 61 in FIG. 4, the file system manager accesses the inode of the specified file to read the mapping flag. If the mapping flag is not set, as tested in step 62, then execution branches to step 63 to select a conventional UNIX-based file mapping procedure to find a pointer to a data block for the specified offset. Then, in step 64, the file system manager performs a read or write to the data block pointed to by the pointer, and execution returns.

In step 62, if the mapping flag is set, then execution continues to step 65. In step 65, an index into the block pointer array in the inode is calculated from the specified offset and the IB extent size in the inode. For example, if the specified offset is in bytes, then the specified offset in blocks is calculated by dividing the specified offset in bytes by the block size in bytes. Then the block pointer array index is calculated by dividing the specified offset in blocks by the product of the indirect block extent size in bytes and the number of data block pointers in each indirect block. In step 66, the file system manager indexes the block pointer array in the inode to obtain a block pointer and an associated flag. In step 67, if the flag is not zero, then execution branches to step 68. In step 68, the file system manager searches a tree of blocks beginning at a block pointed to by the block pointer to find a pointer to a data block for the specified offset. Execution continues to step 64 to read or write to the data block pointed to by the pointer, and execution returns.

In step 67, if the flag is equal to zero, then execution continues to step 69. In step 69, a pointer to the indirect block of interest in the extent is calculated from the indexed block pointer in the block pointer array plus an extent offset, and a pointer to the data block for the specified offset in the file is obtained from the indirect block of interest. For example, the file offset in blocks corresponding to the first indirect block in the extent is the product of the block pointer array index and the IB extent size and the number of data block pointers in each indirect block. The extent offset is calculated by computing the difference between the specified offset in blocks and the file offset in blocks corresponding to the first indirect block in the extent, and dividing this difference by the number of data block pointers in each indirect block. The data block pointer index in the indirect block of interest is the remainder of an integer division of the specified offset in blocks and the number of data block pointers in each indirect block. Execution continues from step 69 to step 64 to read or write to the data block pointed to by the data block pointer, and execution returns.

Figure 5:
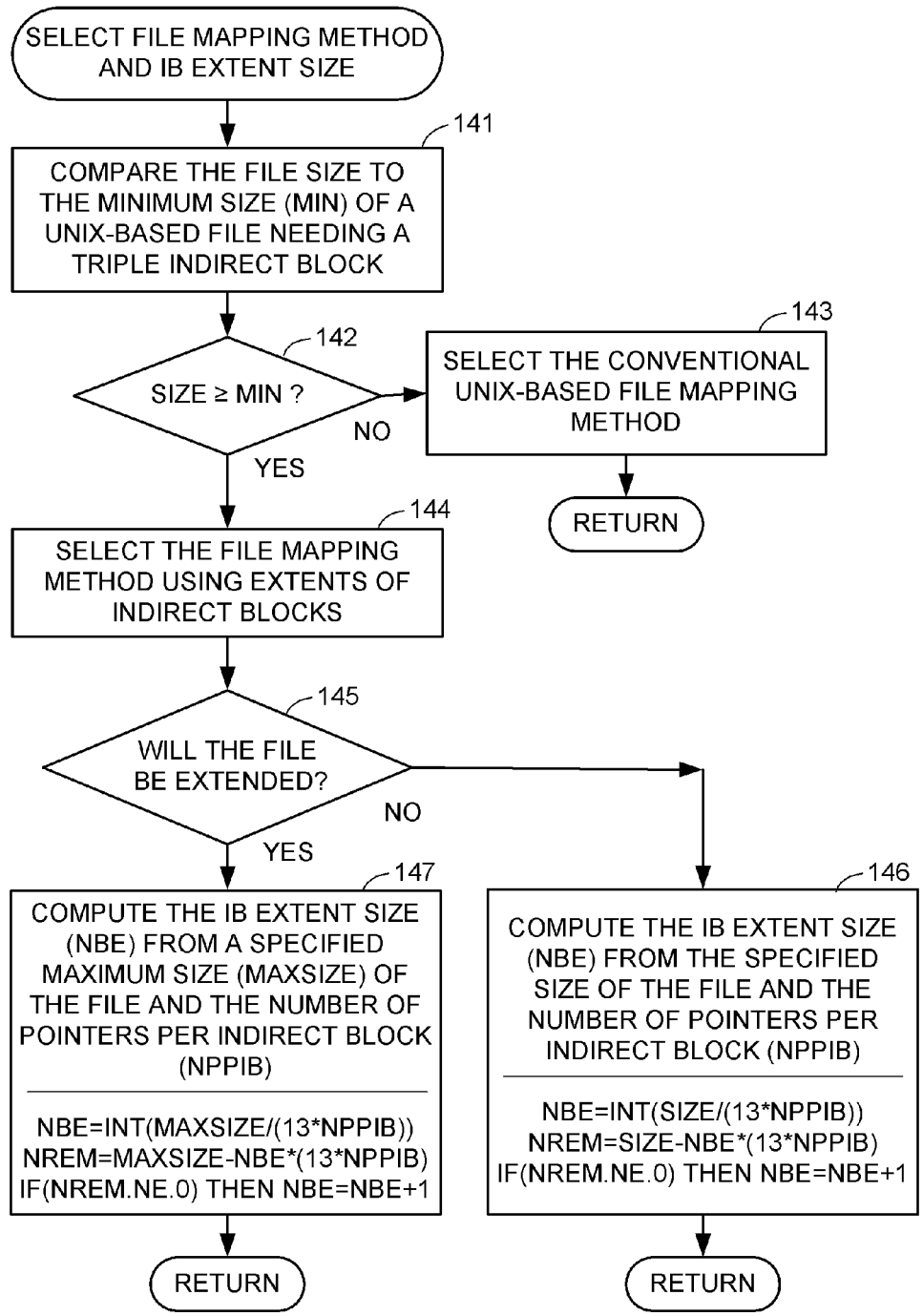
FIG. 5 is a flowchart of a procedure for selecting a file mapping method and an indirect block extent size for a new file in the file system introduced in FIG. 1.

FIG. 5 shows a procedure for selecting a file mapping method for a file in the file system, and for selecting an indirect block extent size when the selected file mapping method is the use of extents of indirect blocks. In general, the use of extents of indirect blocks for file mapping is advantageous when the file size is at least a certain threshold size. For example, when the alternative mapping method is an indirect block tree in accordance with a Unix-based file system, the use of extents of indirect blocks for file mapping is advantageous when the file size would require that a triple indirect block would be needed for the indirect block tree. Therefore, in a first step 141, the file size is compared to the minimum size of a UNIX-based file needing a triple indirect block. In step 142, if the file size is not greater than or equal to this minimum size, then execution branches to step 143 to select the conventional UNIX-based file mapping method, and execution returns.

In step 142, if the file size is greater or equal to the minimum size, then execution continues to step 144. In step 144, the file mapping method using extents of indirect blocks is selected. In step 145, if the file will not be extended, then execution branches to step 146. In step 146, the indirect block extent size is computed from the specified size of the file and the number of data block pointers per indirect block, so that the file mapping metadata will include thirteen extents of indirect blocks and each of the extents will include the same number of indirect blocks. This will result in the use of all of the block pointers in the block pointer array of the inode for the file so that the indirect block extent size will be a minimum size for the specified file size. For example, the number of blocks in each extent is computed by an integer division of the specified file size in blocks by the product of thirteen times the number of data block pointers per indirect block. A remainder of this integer division is computed as the difference between the specified file size in blocks and the number of blocks in each extent times thirteen times the number of data block pointers per indirect block. If this remainder is not zero, then the number of blocks in each extent is incremented by one. Execution returns after step 146.

In step 145, if the file will be extended, then execution continues to step 147. In step 147, the indirect block extent size is computed from a specified maximum size of the file and the number of pointers per indirect block, so that when the file has been extended to the specified maximum size, the file mapping metadata for the file will include thirteen extents of indirect blocks and each of the extents will include the same number of indirect blocks. For example, the number of blocks in each extent is computed by an integer division of the maximum file size in blocks by the product of thirteen times the number of data block pointers per indirect block. A remainder of this integer division is computed as the difference between the maximum file size in blocks and the number of blocks in each extent times thirteen times the number of data block pointers per indirect block. If this remainder is not zero, then the number of blocks in each extent is incremented by one. Execution returns after step 147.

Figure 6:
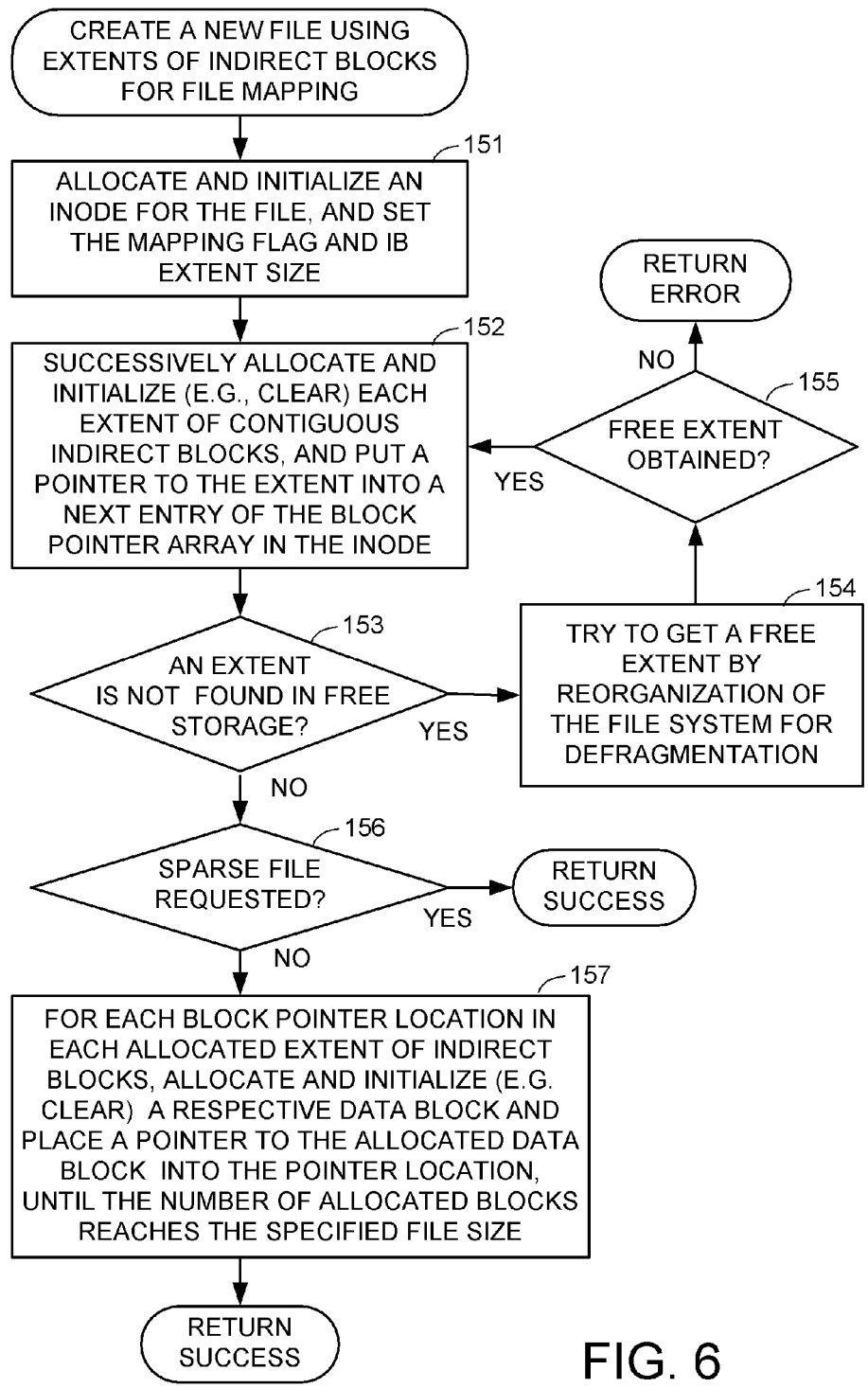
FIG. 6 is a flowchart of a procedure for creating a new file using extents of indirect blocks for file mapping.

FIG. 6 shows a procedure for creating a new file using extents of indirect blocks for file mapping. In a first step 151, an inode for the file is allocated and initialized by setting the mapping flag and the indirect block extent size (as determined in step 146 or 147 in FIG. 5). Then, in step 152, each extent of contiguous indirect blocks is successively allocated and initialized by clearing each indirect block. A pointer to the extent is put into a next entry of the block pointer array in the inode. In step 153, if any required extent of indirect blocks is not found in free storage for the file system, then execution branches to step 154 to reorganize the file system for defragmentation in an attempt to recover contiguous free storage. In step 155, if sufficient contiguous free storage has not been recovered to provide a required free extent, then execution returns with an error message indicating that the new file has not been created due to insufficient contiguous free storage. In this case the calling program could respond to the error message by invoking the conventional UNIX file mapping routine so that the file would be mapped by a tree of indirect blocks. Otherwise, if sufficient contiguous free storage has been recovered to provide a free extent, then execution loops back to step 152.

In step 153, if all required extents are found in free storage, then execution continues from step 153 to step 156. In step 156, if a sparse file has been requested, then execution returns. Otherwise, if a sparse file has not been requested, execution continues from step 156 to step 157. In step 157, for each block pointer location in each allocated extent of indirect blocks, a respective data block is allocated and initialized, and a pointer to the allocated data block is put into the block pointer location, until the number of data blocks reaches the specified file size in blocks. After step 157, execution returns.

It is possible to share data blocks between a file using extents of indirect blocks for file mapping, and a file using a tree of blocks for file mapping. This is advantageous for creating snapshot copies. In this case it is possible for the file using the extents of indirect blocks for file mapping to be either the production file or the snapshot copy. The file using the extents of indirect blocks for file mapping can be the file that is more heavily accessed or the file that is the least transitory so that the performance benefits of the extents of indirect blocks for file mapping are best exploited by the file that is more heavily accessed or the least transitory.

The file that is not using the extents of indirect blocks for file mapping may use a sparse tree structure in which block pointers in the sparse tree structure may point to extents of indirect blocks or may point to child blocks in the sparse tree structure including leaf-level indirect blocks that might not be included in any of the extents of indirect blocks. In this case, the block pointer field in each block pointer in the sparse tree structure may include a flag indicating whether the block pointer is pointing to either an extent of indirect blocks or a child block in the sparse tree structure. For example, if the block pointer is pointing to a child block in the sparse tree structure, the child block may be accessed in accordance with a conventional UNIX-based file mapping or a conventional B-tree mapping.

If the block pointer is pointing to an extent of indirect blocks, then this extent of indirect blocks can be interpreted as an extent having a certain number of indirect blocks depending on the depth of the block pointer in the sparse tree structure. For example, at the very top level of the sparse tree structure, the extent size is the same as the indirect block extent size for the file using the extents of indirect blocks for the file mapping. At the next lowest level of the sparse tree structure, the extent size is this indirect block extent size divided by the number of block pointers in a block in the sparse tree structure.

Figure 7:
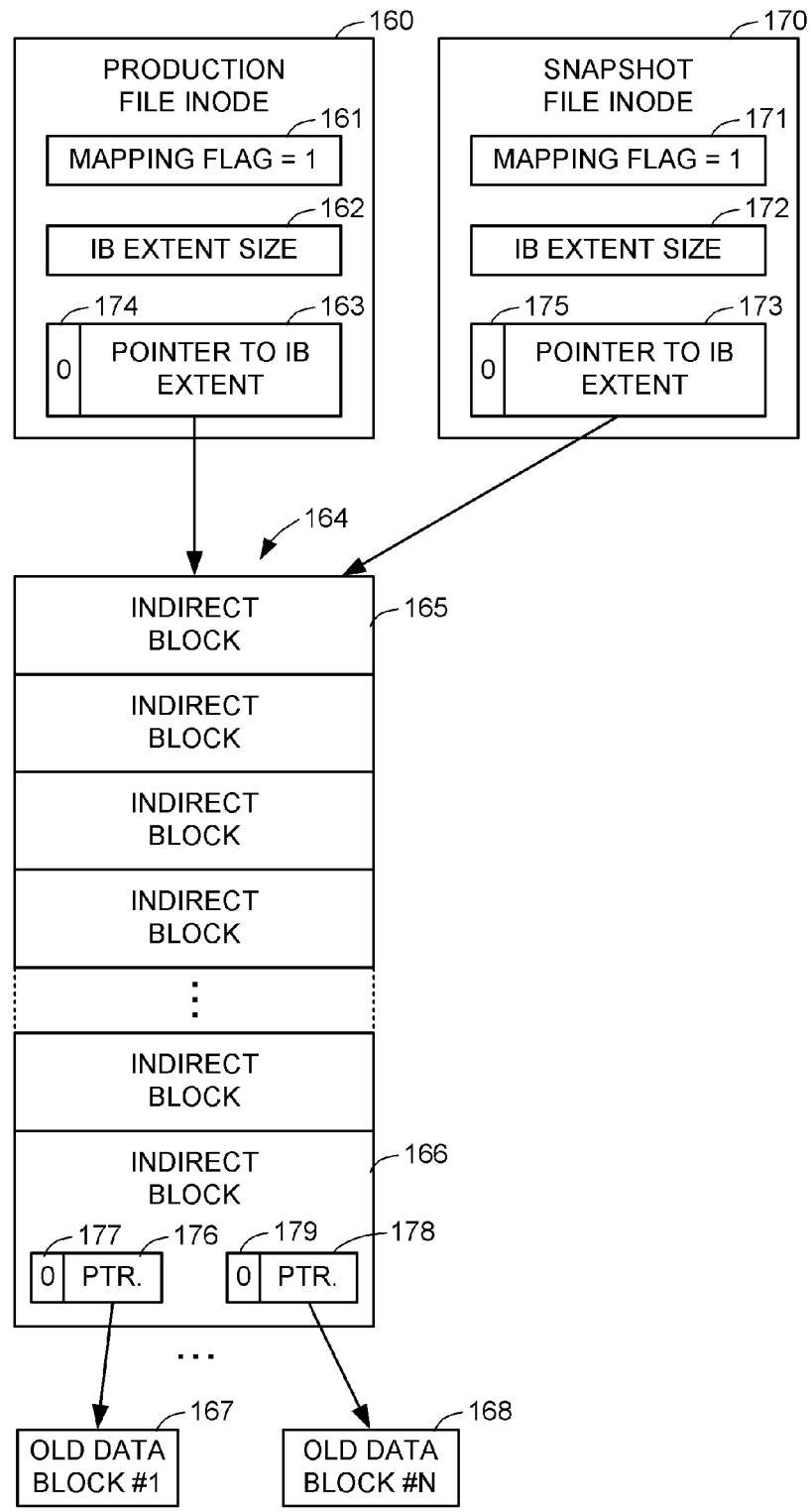
FIG. 7 is a block diagram showing a production file and a snapshot copy sharing an extent of indirect blocks of the production file.

For example, FIG. 7 shows a production file inode 160 having a mapping flag 161 set to one to indicate that the production file is using extents of contiguous indirect blocks for file mapping. The production file inode 160 has an indirect block extent size attribute 162 and a block pointer field 163 including a block pointer to an indirect block extent 164. This block pointer field 163 also has a flag 174 indicating that the pointed-to block is the first indirect block 165 in the extent of indirect blocks.

In the example of FIG. 7, the last indirect block 166 in the extent 164 has a first data block pointer 176 pointing to a first data block 167 and a last data block pointer 178 pointing to a last data block 168. The first data block pointer 176 has an associated flag 177 set to zero, and the second data block pointer 178 has an associated flag 179 that is set to zero. The flags associated with the data block pointers are ownership flags. For example, an ownership flag has a value of zero to indicate that the associated data block is not exclusively owned (i.e., it may be shared) or a value of one to indicate exclusive ownership.

A snapshot copy of the production file is made by allocating an inode 170 to the snapshot copy and copying the contents of the production file inode 160 to the snapshot copy inode 170. Thus, the snapshot file inode 170 has a mapping flag 171 set to one, an IB extent size 172 that is same as the IB extent size of the production file, and a pointer 173 to the extent 164 of indirect blocks, and the pointer 173 has an associated flag 175 set to zero to indicate that the pointer 173 is pointing to an extent of indirect blocks.

Figure 8:
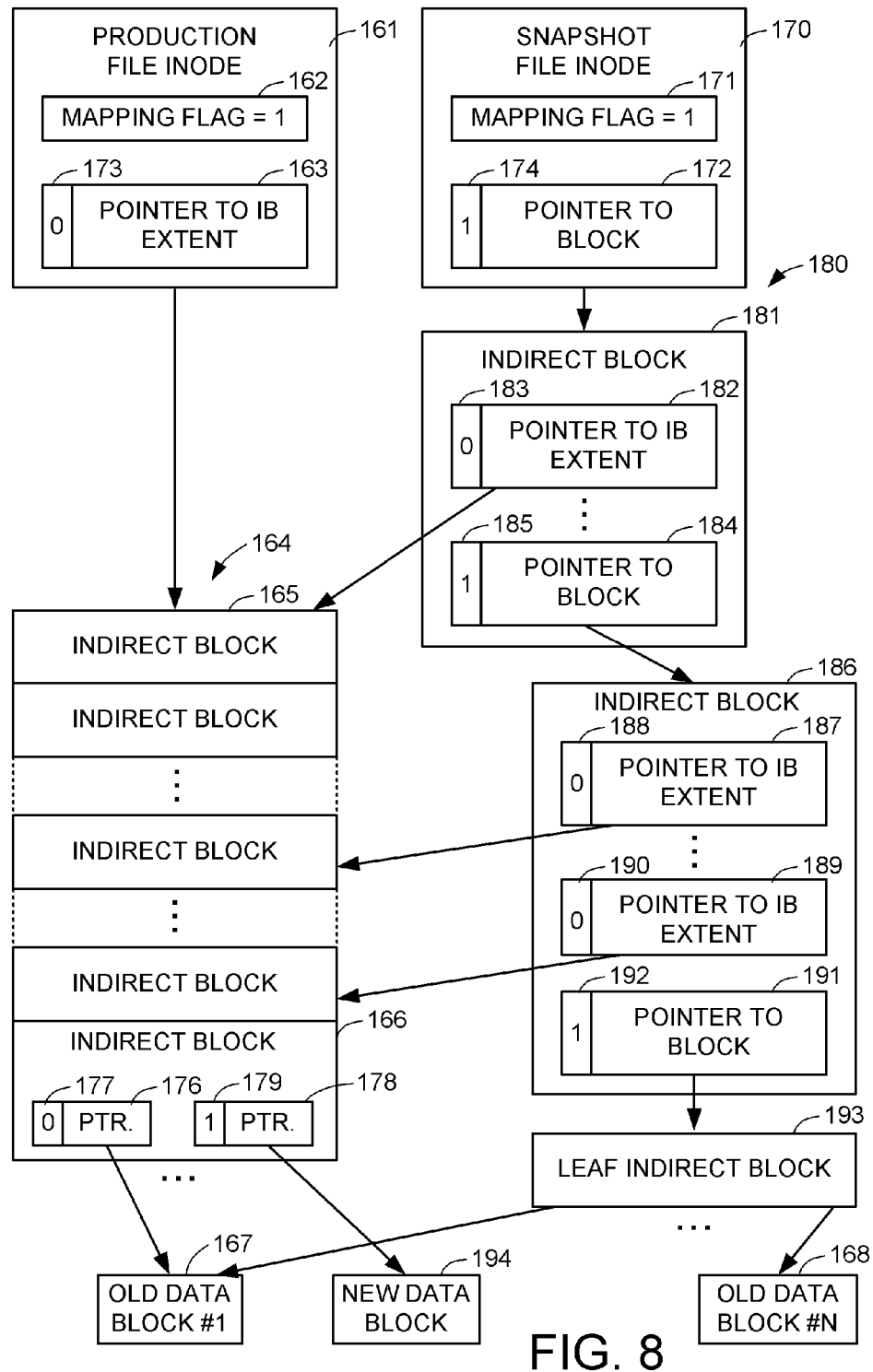
FIG. 8 is a block diagram showing the production file and the snapshot copy as created in FIG. 7 after a block of new data has been written to the production file and the production file maintains an extent of indirect blocks for file mapping.

FIG. 8 shows the production file and the snapshot copy after a write operation upon the production file has resulted in new data being written to the last data block of the production file. In this case, a sparse indirect block tree 180 is constructed for mapping the old data block 168 in the snapshot copy so that a new data block 194 can be allocated to the production file and the new data can be written to the new data block 194. The last pointer 178 in the last indirect block 166 of the extent 164 is changed to point to the new data block 194, and the ownership flag 179 associated with the pointer 178 is set to one to indicate that the new data block 194 is exclusively owned by the production file.

The sparse indirect block tree 180 includes an indirect block 181 that is a child of the snapshot file inode 170, an indirect block 186 that is a child of the indirect block 181, and a leaf-level indirect block 193. The contents of the last indirect block 166 of the extent 164 are copied to the leaf-level indirect block 193 before the pointer 178 is changed to point to the new data block 194. Thus, the leaf-level indirect block 193 shares the first data block 167 with the production file.

To link the indirect blocks in the indirect block tree 180 to each other and to the snapshot file inode 170, the pointer 172 is changed to point to the indirect block 181 and the flag 174 is set to one to indicate that the pointer 172 is pointing to an indirect block tree. The indirect block 181 has a pointer 182 that is set to point to the first indirect block 165 of the extent 164, and the pointer 182 has an associated flag 183 that is set to zero to indicate that the pointer 182 is pointing to an extent of indirect blocks. The indirect block 181 has another pointer 184 that is set to point to the indirect block 186, and the pointer 184 has an associated flag 185 set to one to indicate that the pointer 184 is pointing to a child block in the indirect block tree 180. The indirect block 186 has a pointer 187 pointing to an indirect block in the extent 164 and the pointer 187 has an associated flag 188 that is set to zero to indicate that the pointer is pointing to an indirect block in an extent of indirect blocks. In this case, at the level of the indirect block 186 in the indirect block tree 180, the extent size is one block, and the value of zero for the flag 188 is an indication that the pointed-to indirect block is shared between the production file and the snapshot file. In a similar fashion, the indirect block 186 includes another pointer 189 to another indirect block in the extent 164, and the pointer 189 has an associated flag 190 set to zero indicating that the pointer 189 is pointing to an indirect block in an extent of indirect blocks. Finally, the indirect block 186 has a pointer 191 pointing to the leaf-level indirect block 193, and the pointer 191 has an associated flag 192 set to one to indicate that the pointer 191 is pointing to a child block in the indirect block tree 180.

Figure 9:
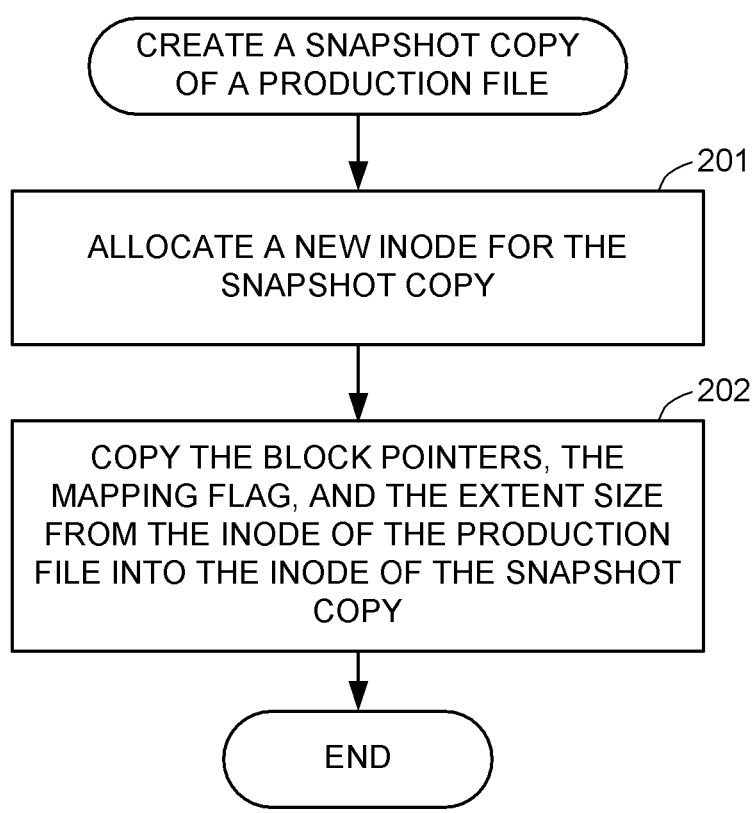
FIG. 9 is a flowchart of a procedure for creating a snapshot copy as shown in FIG. 7.

FIG. 9 shows a procedure for creating the snapshot copy of FIG. 7. In a first step 201 in FIG. 9, a new inode for the snapshot copy is allocated. Then, in step 202, the contents of the inode of the production file are copied into the inode of the snapshot copy so that the snapshot copy inode has the same mapping flag, indirect block extent size, and block pointers as the inode of the production file. Therefore the snapshot shares the indirect blocks and data blocks of the production file as shown in FIG. 7. After step 202, the procedure of FIG. 9 is finished.

Figure 10:
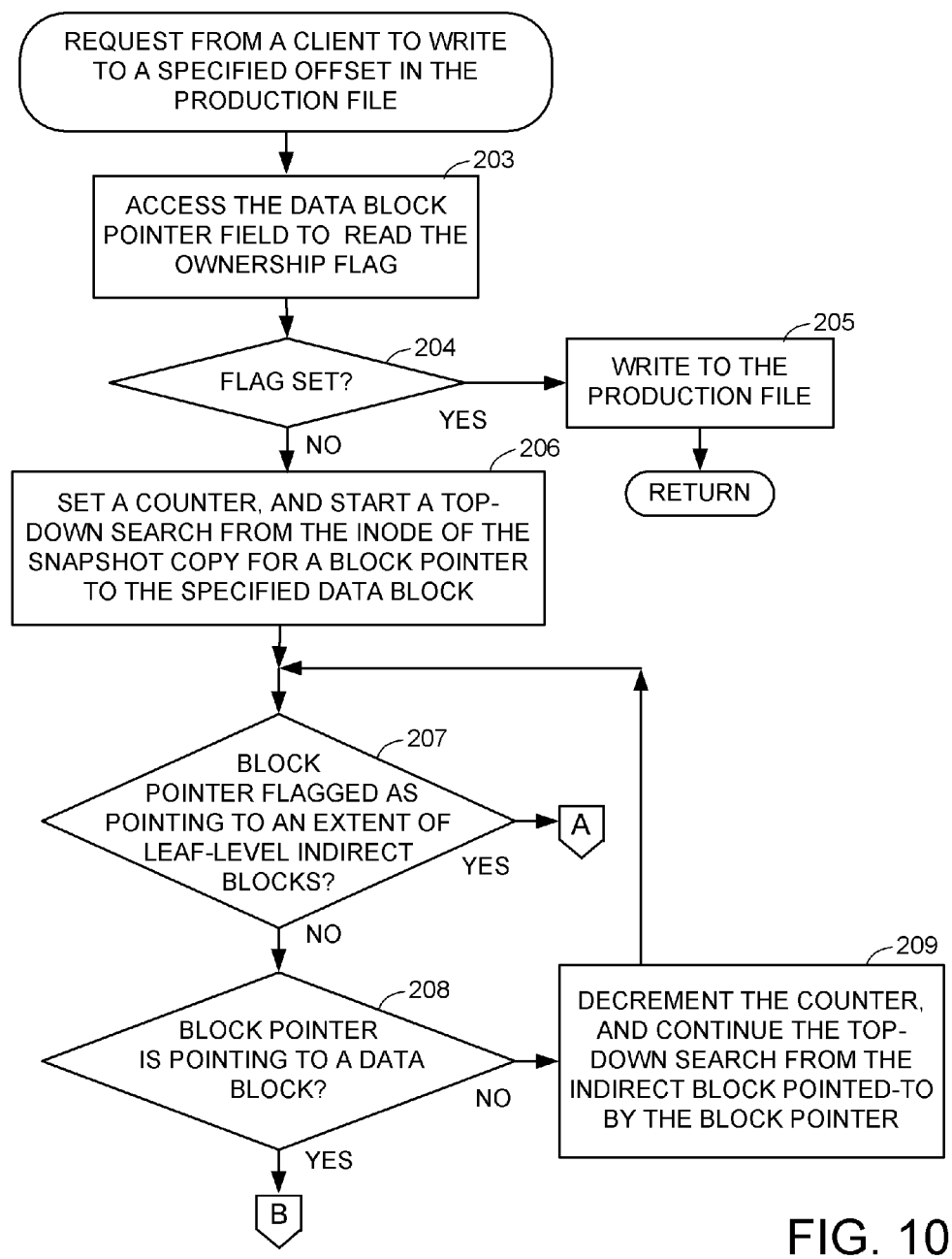
FIG. 10 and FIG. 11 together comprise a flowchart of a procedure to write to a specified offset in the production file shown in FIG. 8.
Figure 11:
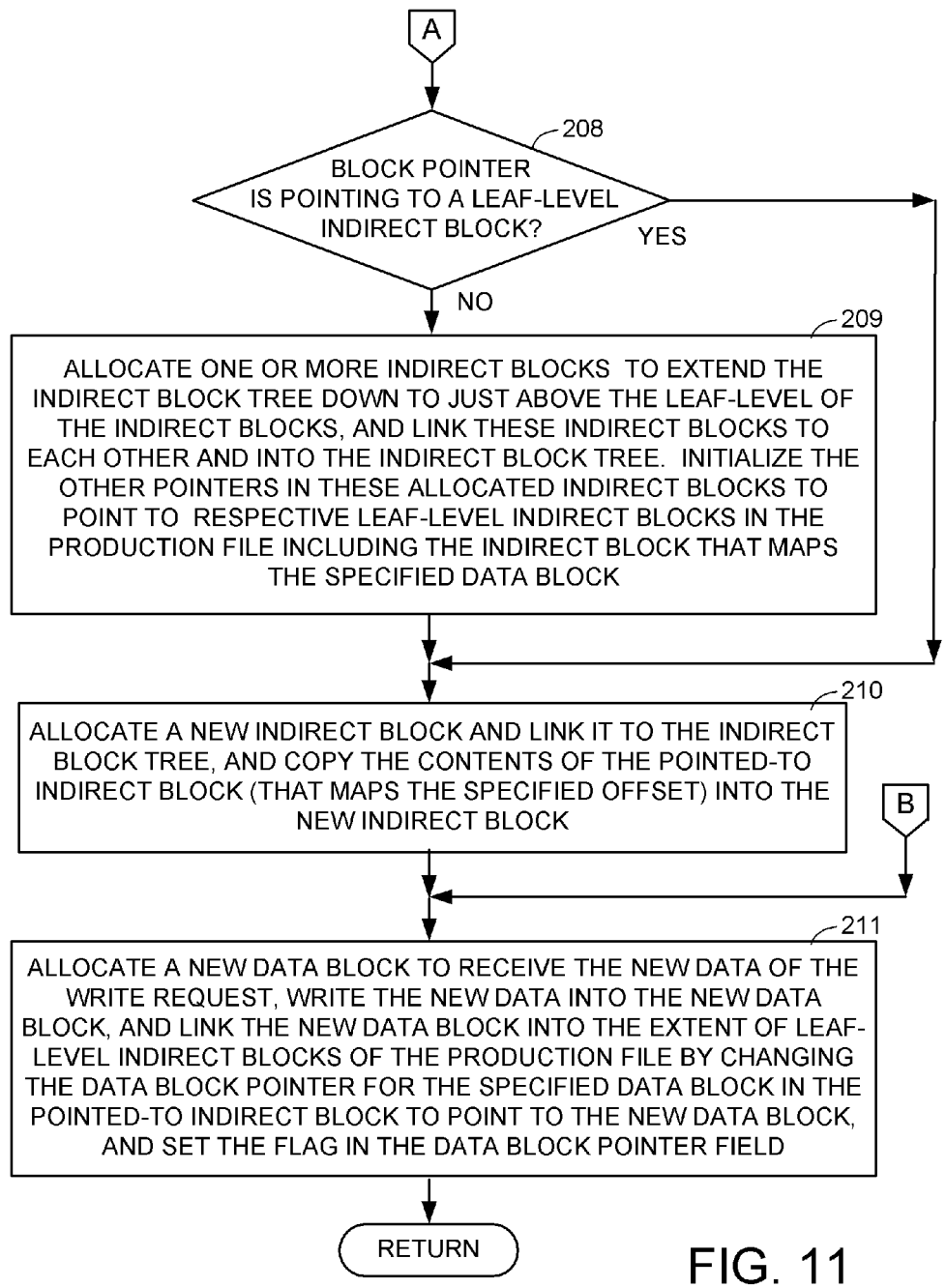

FIGS. 10 and 11 show a procedure for performing a write operation to a specified offset in the production file shown in FIG. 8. This snapshot copy process is performed when the snapshot copy facility receives a request from a client to write new data to a specified offset in the production file. In response to this write request, in step 203, the snapshot copy facility accesses the data block pointer field for the specified offset in the extent of indirect blocks that are mapping the production file, and reads the associated ownership flag. In step 204, if the ownership flag is set, then execution continues to step 205 to write the new data to the data block pointed to by the data block pointer read from the data block pointer field. After step 205, execution returns.

In step 204, if the ownership flag is not set, then the specified data block in the production file is shared between the production file and the snapshot copy. In this case, execution branches from step 204 to step 206. In step 206, the snapshot copy facility sets a counter, and starts a top-down search from the inode of the snapshot copy for a block pointer to the specified data block. For example, for the file structure of FIG. 3, the file system manager computes a block pointer array index by dividing a specified offset (in blocks) from the write request by the product of the number of block pointers per indirect block and the indirect block extent size (in blocks). The counter is set to the number of indirect block levels needed for an indirect block tree for mapping of the file. For example, the number of indirect blocks needed for an indirect block tree is computed from the indirect block extent size (in blocks) and the number of block pointers in each indirect block. If the indirect block extent size is one block, then the counter is set to a value of one. Otherwise, if the indirect block extent size is less than or equal to the number of block pointers in each indirect block, then the counter is set to a value of two. Otherwise, if the indirect block extent size is less than or equal to the square of the number of block pointers in each indirect block, then the counter is set to a value of three. Otherwise, if the indirect block extent size is less than or equal to the cube of the number of block pointers in each indirect block, then the counter is set equal to a value of four, and so on. Then the file system manager reads the indexed block pointer from the block pointer array.

In step 207, if the block pointer is not flagged as pointing to an extent of leaf-level indirect blocks, then execution continues to step 208. In step 208, if the block pointer is not pointing to a data block, the execution branches to step 209. For example, in step 208, the value of the counter is compared to zero, and if the counter does not have a value of zero, then the block pointer is not pointing to a data block. In step 209, the counter is decremented by one, and the top-down search is continued from the indirect block pointed to by the block pointer. The offset specified in the write request is used to calculate the index of a block pointer in the indirect block for continuing the top-down search for a block pointer to the specified data block. For example, the index is computed as the remainder of an integer division of the specified offset in blocks by the number of block pointers in each indirect block raised to the power of the value of the counter. Execution loops from step 209 back to step 207.

In step 208, if the block pointer is pointing to a data block, then there is no need to modify the indirect block tree to accommodate the write request. In this case, execution continues to step 211 in FIG. 11. In step 211, a new data block is allocated to receive the new data of the write request. This new data is written into the new data block, and the new data block is linked into the extent of leaf-level indirect blocks of the production file by changing the data block pointer for the specified offset to point to the new data block. Also the ownership flag on this data block pointer is set to one to indicate that the new data block is exclusively owned by the production file. After step 211, execution returns.

In step 207 of FIG. 10, if the block pointer is flagged as pointing to an extent of leaf-level indirect blocks, then execution branches to step 208 in FIG. 11. In step 208, if the block pointer is not pointing to a leaf-level indirect block (i.e., the counter value is not one), then execution continues from step 208 to step 209. In step 209, one or more indirect blocks (as indicated by the value of the counter minus one) are allocated to extend the indirect block tree down to just above the leaf-level of indirect blocks, and these newly allocated indirect blocks are linked to each other and into the indirect block tree. The other block pointers in these newly allocated indirect blocks are initialized to point to respective leaf-level indirect blocks in the production file. Execution continues from step 209 to step 210.

In step 210, a new indirect block is allocated, and the contents of the pointed-to indirect block (that maps the specified offset) are copied into this new indirect block, and this new indirect block is linked to the indirect block tree in lieu of the pointed-to indirect block. Execution continues from step 210 to step 211.

In step 208, if the block pointer is pointing to a leaf-level indirect block, then execution branches to step 210.

Figure 12:
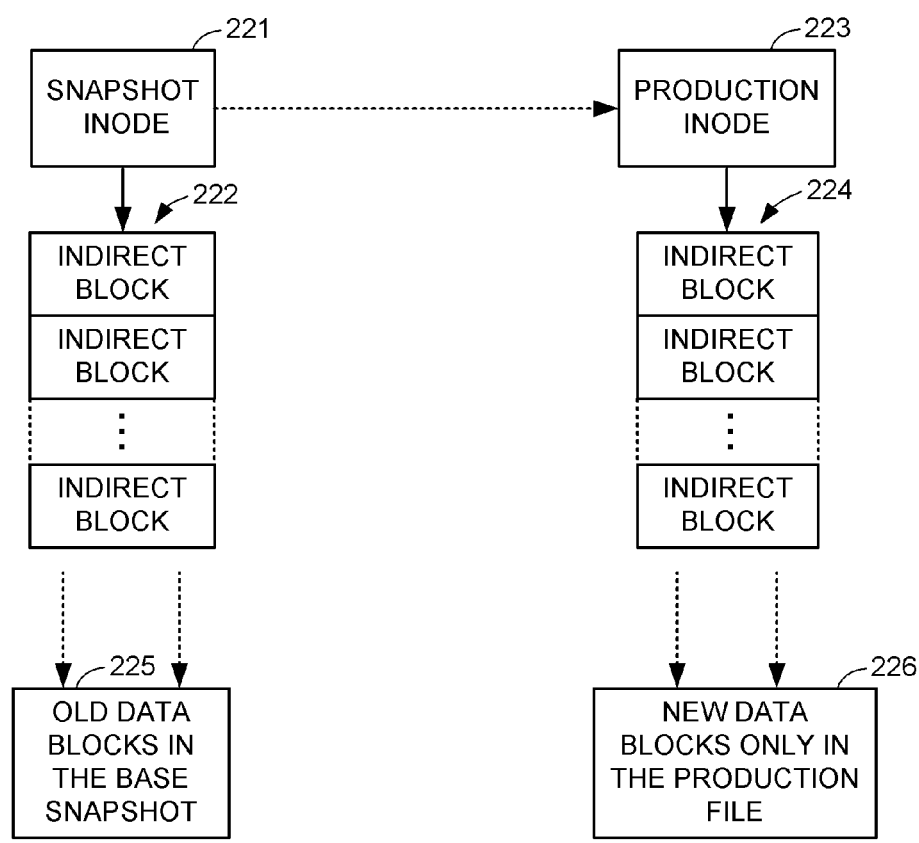
FIG. 12 shows an alternative snapshot copy process in which the snapshot copy maintains an extent of indirect blocks for file mapping.

FIG. 12 shows an alternative example in which the snapshot 221 uses an extent of contiguous indirect blocks 222 for file mapping, and in which the production file 223 uses a combination of the extent 222 for mapping old data blocks and an extent of contiguous indirect blocks 224 for mapping new data blocks allocated since the creation of the snapshot. In this example, when a new block of data is written to a specified offset in the production file, the pointer field to the data block of the specified offset is first read from the extent 222, and if the ownership flag in this pointer field is not set to one, then the new data is written to a newly allocated data block, the flag in this pointer field is set to one, and a pointer to the newly allocated data block is put in the corresponding pointer field in the corresponding indirect block in the extent 224. Otherwise, if the flag in the pointer field in the extent 222 is set to one, then the extent 224 is accessed to read the corresponding pointer field in the extent 224, and the new data is written to the data block pointed to by the corresponding pointer in the extent 224. Once all of the data blocks of the production file have been changed in comparison to the snapshot, the production file becomes exclusively mapped by the extent 224.

In view of the above, there has been described a file mapping scheme for reducing the time for read or write access to large files in a file system while allowing allocation of data blocks one at a time. The mapping scheme maps the large files in the file system by extents of contiguous indirect blocks. The inode of a file includes an indication of whether file mapping metadata of the file includes either an extent of contiguous indirect blocks or a tree of blocks. In a preferred mapping scheme, an inode contains an array of block pointer entries, and each entry includes a flag indicating whether the block pointer is pointing to either an extent of indirect blocks or a tree of blocks. For sharing of data blocks between files, the block pointer fields of the indirect blocks each contain an ownership flag indicating whether the pointed-to block is shared or not. For example, a production file is mapped by one or more extents of indirect blocks, and a snapshot copy of the production file is mapped by a combination of the one or more extents of indirect blocks and a sparse tree of blocks.

What is claimed is:

1. A method of operating a file server, the file server having data storage storing a file system, a data processor coupled to the data storage for access to files in the file system, and non-transitory computer readable storage medium coupled to the data processor and storing computer instructions, each of the files having an inode containing file attributes including an indication of whether file mapping metadata of said each of the files includes either an extent of contiguous indirect blocks or a tree of blocks, so that some of the files in the file system are mapped by one or more extents of contiguous indirect blocks, and some of the files in the file system are mapped by one or more trees of blocks, and the computer instructions, when executed by the data processor, perform a write operation to write data to a specified offset in a logical extent of a specified file in the file system by the steps of:

(a) reading the inode of the specified file to obtain an indication of whether the file is mapped at the specified offset by either an extent of contiguous indirect blocks or a tree of blocks, and (b) using the indication of whether the file is mapped at the specified offset by either an extent of contiguous indirect blocks or a tree of blocks to obtain, from the file mapping metadata, a pointer to a data block for containing data at the specified offset of the specified file, and (c) using the pointer to write data to the data block for containing data at the specified offset in the logical extent of the specified file.

2. The method as claimed in claim 1, wherein the indication of whether the file is mapped at the specified offset by either an extent of contiguous indirect blocks or a tree of blocks is a flag indicting whether the file is mapped either by one or more extents of contiguous indirect blocks or in accordance with a UNIX-based file mapping method.

3. The method as claimed in claim 1, wherein the indication of whether the file is mapped at the specified offset by either an extent of contiguous indirect blocks or a tree of blocks is a flag in a block pointer field of the inode, and the flag indicates whether a block pointer in the block pointer field is pointing to either an extent of contiguous indirect blocks or to a tree of blocks.

4. The method as claimed in claim 1, wherein the indication of whether the file is mapped at the specified offset by either an extent of contiguous indirect blocks or a tree of blocks indicates that the file is mapped at the specified offset by an extent of contiguous indirect blocks, and the contiguous indirect blocks include pointer fields each containing a block pointer and an associated ownership flag, and wherein step (b) further includes reading the ownership flag associated with the pointer to a data block for containing data at the specified offset of the specified file in order to verify that the specified file is an exclusive owner of the data block for containing data at the specified offset of the specified file.

5. The method as claimed in claim 1, wherein the method further includes the computer instructions, when executed by the data processor, selecting a file mapping method for a new file by comparing a specified size for the new file to a threshold size, and selecting extent of contiguous indirect blocks for file mapping of the new file when the specified size is at least the threshold size.

6. The method as claimed in claim 5, wherein the trees of blocks are trees of indirect blocks in accordance with a UNIX-based file mapping method, and the threshold size is the minimum size of a file using the UNIX-based file mapping method and having a triple indirect block.

7. The method as claimed in claim 5, wherein the new file has an inode including a certain number of block pointers, and wherein the method further includes the computer instructions, when executed by the data processor, selecting an indirect block extent size for the new file by dividing the specified file size by the product of the certain number of block pointers and a number of data block pointers in each indirect block in the extent of contiguous indirect blocks for file mapping of the new file.

8. A method of operating a file server, the file server having data storage storing a file system, a data processor coupled to the data storage for access to files in the file system, and non-transitory computer readable storage medium coupled to the data processor and storing computer instructions, some of the files in the file system having file mapping metadata including an extent of contiguous indirect blocks, and some of the files in the file system having file mapping metadata including a tree of blocks, and the computer instructions, when executed by the data processor, perform a write operation to write data to a specified offset in a logical extent of a production file in the file system while maintaining a snapshot copy of the production file by the steps of:
(a) accessing an indirect block in an extent of contiguous indirect blocks to read an ownership flag for the specified offset, and
(b) in response to the ownership flag indicating that a data block for the specified offset is shared between the production file and the snapshot copy of the production file, writing data to a new data block for the production file, and changing the ownership flag to indicate that the data block for the specified offset is not shared between the production file and the snapshot copy of the production file, and extending a tree of blocks for file mapping of the data block that is no longer shared between the production file and the snapshot copy;
wherein the extended tree of blocks includes some block pointers pointing to indirect blocks in the extent of contiguous indirect blocks, and other bock pointers pointing to indirect blocks in the extended tree of blocks, and each block pointer is in a respective block pointer field containing a respective flag indicating whether the block pointer in the block pointer field is pointing to either an indirect block in the extent of contiguous indirect blocks or a child block in the extended tree of blocks, and the flag is used to select either a first method for accessing a pointed-to indirect block in the extent of contiguous indirect blocks or a second method for accessing a pointed-to child block in the extended tree of blocks.

9. The method as claimed in claim 8, wherein the extent of contiguous indirect blocks is pointed to by a pointer in an inode of the production file, and the tree of blocks is pointed to by a pointer in an inode of the snapshot copy of the production file.

10. The method as claimed in claim 9, wherein the pointer in the inode of the production file has an associated flag in the inode of the production file, and the associated flag in the inode of the production file indicates that the pointer in the inode of the production file is pointing to an extent of contiguous indirect blocks, and
wherein the pointer in the inode of the snapshot copy has an associated flag in the inode of the snapshot copy, and the associated flag in the inode of the snapshot copy indicates that the pointer in the inode of the snapshot copy is pointing to a tree of blocks.

11. A file server comprising:
data storage containing a file system;
a data processor coupled to the data storage for access to files in the file system; and
non-transitory computer readable storage medium coupled to the data processor and storing computer instructions, and
each of the files having an inode containing file attributes including an indication of whether file mapping metadata of said each of the files includes either an extent of contiguous indirect blocks or a tree of blocks, so that some of the files in the file system are mapped by one or more extents of contiguous indirect blocks, and some of the files in the file system are mapped by one or more trees of blocks, and the computer instructions, when executed by the data processor, perform a read operation to read data from a specified offset in a logical extent of a specified file in the file system by the steps of:
(a) reading the inode of the specified file to obtain an indication of whether the file is mapped at the specified offset by either an extent of contiguous indirect blocks or a tree of blocks, and
(b) using the indication of whether the file is mapped at the specified offset by either an extent of contiguous indirect blocks or a tree of blocks to obtain, from the file mapping metadata, a pointer to a data block containing data at the specified offset of the specified file, and
(c) using the pointer to read data to the data block for containing data at the specified offset in the logical extent of the specified file.

12. The file server as claimed in claim 11, wherein the indication of whether the file is mapped at the specified offset by either an extent of contiguous indirect blocks or a tree of blocks is a flag indicting whether the file is mapped either by one or more extents of contiguous indirect blocks or in accordance with a UNIX-based file mapping method.

13. The file server as claimed in claim 11, wherein the indication of whether the file is mapped at the specified offset by either an extent of contiguous indirect blocks or a tree of blocks is a flag in a block pointer field of the inode, and the flag indicates whether a block pointer in the block pointer field is pointing to either an extent of contiguous indirect blocks or to a tree of blocks.

14. The file server as claimed in claim 11, wherein the computer instructions, when executed by the data processor, further perform a write operation upon a production file mapped by an extent of contiguous indirect blocks, and the contiguous indirect blocks include pointer fields each containing a block pointer and an associated ownership flag, and the performance of the write operation includes reading the ownership flag associated with a pointer to verify that the production file is an exclusive owner of a data block to be written to.

15. The file server as claimed in claim 11, wherein the computer instructions, when executed by the data processor, select a file mapping method for a new file by comparing a specified size for the new file to a threshold size, and select an extent of contiguous indirect blocks for file mapping of the new file when the specified size is at least the threshold size.

16. The file server as claimed in claim 15, wherein the trees of blocks are trees of indirect blocks in accordance with a UNIX-based file mapping method, and the threshold size is the minimum size of a file using the UNIX-based file mapping method and having a triple indirect block.

17. The file server as claimed in claim 15, wherein the new file has an inode including a certain number of block pointers, and wherein the method further includes the computer instructions, when executed by the data processor, selecting an indirect block extent size for the new file by dividing the specified file size by the product of the certain number of block pointers and a number of data block pointers in each indirect block in the extent of contiguous indirect blocks for file mapping of the new file.

18. The file server as claimed in claim 11, wherein the computer instructions, when executed by the data processor, perform a write operation to write data to a data block of a production file in the file system while maintaining a snapshot copy of the production file by the steps of:

(a) accessing an indirect block in an extent of contiguous indirect blocks to read an ownership flag for the data block of the production file, and (b) in response to the ownership flag indicating that the data block of the production file is shared between the production file and the snapshot copy of the production file, changing the ownership flag to indicate that the data block of the production file is no longer shared between the production file and the snapshot copy of the production file, extending a tree of blocks for file mapping of the data block that is no longer shared between the production file and the snapshot copy, and writing data to a new data block for the production file;

wherein the extended tree of blocks includes some block pointers pointing to indirect blocks in the extent of contiguous indirect blocks, and other bock pointers pointing to indirect blocks in the extended tree of blocks, and each block pointer is in a respective block pointer field containing a respective flag indicating whether the block pointer in the block pointer field is pointing to either an indirect block in the extent of contiguous indirect blocks or a child block in the extended tree of blocks, and the flag is used to select either a first method for accessing a pointed-to indirect block in the extent of contiguous indirect blocks or a second method for accessing a pointed-to child block in the extended tree of blocks.

19. The file server as claimed in claim 18, wherein the extent of contiguous indirect blocks is pointed to by a pointer in an inode of the production file, and the tree of blocks is pointed to by a pointer in an inode of the snapshot copy of the production file.

20. The file server as claimed in claim 19, wherein the pointer in the inode of the production file has an associated flag in the inode of the production file, and the associated flag in the inode of the production file indicates that the pointer in the inode of the production file is pointing to an extent of contiguous indirect blocks, and wherein the pointer in the inode of the snapshot copy has an associated flag in the inode of the snapshot copy, and the associated flag in the inode of the snapshot copy indicates that the pointer in the inode of the snapshot copy is pointing to a tree of blocks.

\* \* \* \* \*